(12) United States Patent
Meek et al.

(10) Patent No.: US 7,310,632 B2
(45) Date of Patent: Dec. 18, 2007

(54) DECISION-THEORETIC WEB-CRAWLING AND PREDICTING WEB-PAGE CHANGE

(75) Inventors: Christopher A. Meek, Kirkland, WA (US); Carl M. Kadie, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 405 days.

(21) Appl. No.: 10/777,365

(22) Filed: Feb. 12, 2004

(65) Prior Publication Data

US 2005/0192936 A1    Sep. 1, 2005

(51) Int. Cl.
*G06F 17/30* (2006.01)

(52) U.S. Cl. .............................. 707/3; 707/2
(58) Field of Classification Search ............... 707/3
See application file for complete search history.

(56) References Cited

U.S. PATENT DOCUMENTS

2004/0225644 A1* 11/2004 Squillante et al. ............. 707/3

OTHER PUBLICATIONS

J. L. Wolf, et al., Optimal Crawling Strategies for Web Search Engines, WWW2002, May 7-11, 2002, Honolulu, Hawaii.
J L Wolf, et al., "Optimal crawling strategies for web search engines", 2002, pp. 136-147, Retrieved from the Internet: URL:http://delivery.ac,.org/10.1145/520000/511465/p136-wolf.pdf>.
J Cho, et al., "Effective page refresh policies for Web crawlers", vol. 28, No. 4, Dec. 2003, pp. 390-426, Retrieved from the Internet: URL:http://delivery.acm.org/10.1145/960000/958945/p390-cho.pdf>.
H Bullot, et al., "A data-mining approach for optimizing performance of an incremental crawler", Oct. 13, 2003, pp. 610-615.
P Baldi, et al., "Modeling the Internet and the Web: Probabilistic Methods and Algorithms", Sep. 10, 2003, pp. 149-170, Retrieved from the Internet: URL:http://www3.interscience.wiley.com/cgi-bin/booktext/105057041/BOOKPDFSTART>.
Partial European Search Report mailed Sep. 21, 2006, for European Patent Application Ser. No. EP 05 10 0622, 4 Pages.

* cited by examiner

*Primary Examiner*—Apu Mofiz
*Assistant Examiner*—Paul Kim
(74) *Attorney, Agent, or Firm*—Amin, Turocy & Calvin, LLP

(57) ABSTRACT

Systems and methods are described that facilitate predictive web-crawling in a computer environment. Aspects of the invention provide for predictive, utility-based, and decision theoretic probability assessments of changes in subsets of web pages, enhancing web-crawling ability and ensuring that web page information is maintained in a fresh state. Additionally, the invention facilitates selective crawling of pages with a high probability of change.

18 Claims, 11 Drawing Sheets

DECISION-THEORETIC WEB-CRAWLING AND PREDICTING WEB-PAGE CHANGE

TECHNICAL FIELD

The present invention relates generally to data analysis, and more particularly to systems and methods for obtaining information from a networked system utilizing a distributed web-crawler.

BACKGROUND OF THE INVENTION

The evolution of computers and networking technologies from high-cost, low-performance data processing systems to low cost, high-performance communication, problem solving and entertainment systems has provided a cost-effective and time saving means to lessen the burden of performing every day tasks such as correspondence, bill paying, shopping, budgeting and information gathering. For example, a computing system interfaced to the Internet, via wire or wireless technology, can provide a user with a channel for nearly instantaneous access to a wealth of information from a repository of web sites and servers located around the world, at the user's fingertips.

Typically, the information available via web sites and servers is accessed via a web browser executing on a web client (e.g., a computer). For example, a web user can deploy a web browser and access a web site by entering the web site Uniform Resource Locator (URL) (e.g., a web address and/or an Internet address) into an address bar of the web browser and pressing the enter key on a keyboard or clicking a "go" button with a mouse. The URL typically includes four pieces of information that facilitate access: a protocol (a language for computers to communicate with each other) that indicates a set of rules and standards for the exchange of information, a location to the web site, a name of an organization that maintains the web site, and a suffix (e.g., corn, org, net, gov, and edu) that identifies the type of organization.

In some instances, the user knows, a priori, the name of the site or server, and/or the URL to the site or server that the user desires to access. In such situations, the user can access the site, as described above, via entering the URL in the address bar and connecting to the site. However, in many instances, the user does not know the URL or the site name. Instead, the user employs a search engine to facilitate locating a site based on keywords provided by the user. In general, the search engine is comprised of executable applications or programs that search the contents of web sites and servers for keywords, and return a list of links to web sites and servers where the keywords are found. Basically, the search engine incorporates a web "crawler" (aka, a "spider" or a "robot") that retrieves as many documents as possible (e.g., via retrieving URLs associated with the documents). This information is then stored such that an indexer can manipulate the retrieved data. The indexer reads the documents, and creates a prioritized index based on the keywords contained in each document and other attributes of the document. Respective search engines generally employ a proprietary algorithm to create indices such that meaningful results are returned for a query.

Thus, a web-crawler is crucial to the operation of search engines. In order to provide current and up-to-date search results, the crawler must constantly search the web to find new web pages, to update old web page information, and to remove deleted pages. The number of web pages found on the Internet is astronomical. It therefore requires that a web-crawler be extremely fast. Since most web-crawlers gather their data by polling servers that provide the web pages, a crawler must also be as unobtrusive as possible when accessing a particular server. In the extreme, the crawler can absorb all of the server's resources very quickly and cause the server to shut down. Generally, a crawler identifies itself to a server and seeks permission before accessing a server's web pages. At this point, a server can deny access to an abusive crawler that steals all of the server's resources. A web page hosting server typically benefits from search engines, because they allow users to find their web pages more easily. Thus, most servers welcome crawlers, as long as they do not drain too much of the server's resources, which can detrimentally impede a users' ability to exploit server contents.

The sheer volume of information on the Internet today presents a seemingly insurmountable obstacle to efficient web-crawling. For example, a typical web-crawler attempting to catalogue every page on the Internet can take weeks or even months to plod through them. A page that is updated a moment after it has been crawled might not be recrawled for months, in which case the information associated with the page is not accurately catalogued, which in turn reduces the efficiency with which a user can receive information relevant to a search. Thus, there is an unmet need in the art for systems and methods that improve web-crawling speed and efficiency.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention provides systems and methods that facilitate predictive analysis of web pages via a decision-theoretic approach to prioritizing web pages to be crawled. According to an aspect of the invention, a statistical approach to predicting when a web page will change can be applied. The decision-theoretic web-crawling approach can selectively choose pages to download in order to maximize an expected payoff. The decision-theoretic approach comprises algorithms that facilitate page selection for crawling based on a set of possible actions to be taken, a set of possible outcomes of the actions, probability that a particular outcome will result from a particular action, and a utility factor for each outcome, which captures the value of the outcome. Such algorithms are employed to select a best action via applying a Maximum Expected Utility Principal.

According to a related aspect of the invention, web page change can be predicted to facilitate a determination regarding page crawling priority. The probability that a web page has changed since the last crawl can be determined via analysis of, for example, historical change information related to the specific page(s) in question, as well as historical change data regarding other pages. Additionally, various features of page can be utilized to predict when the page will change. For example, a page's URL can be analyzed to determine whether it ends with ".html," ".com," etc. Similarly, features of the document or HTML (e.g., whether it contains a table, a photo, etc.) can be assessed to predict a page change. Furthermore, features of the words on a page and/or HTTP status information obtained during page-download can be utilized to predict when the page will change.

According to another aspect of the invention, feedback/feed-forward loops can be provided to enhance web page change prediction. This aspect provides for creating a sample set of URLs and crawling them at regular intervals regardless of change probability in order to glean training data for learning probability predictors, tuning parameters of crawl strategies, etc. Samples can be weighted by value, such value determined by, for example, the number times a URL appeared in a result set for a user search, the frequency with which a URL was clicked by a user who received the URL in a result set for a search, etc. The sample set can be updated at regular intervals, such that individual URLs or subsets of URLs can be traded in or out of the sample set, such that after a period of time (e.g., a month, two months, etc.) the sample set can be completely new. Alternatively, sample sets can be entirely swapped out according to a predefined schedule.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following detailed description of the invention when considered in conjunction with the drawings.

DETAILED DESCRIPTION OF THE INVENTION

Figure 1:
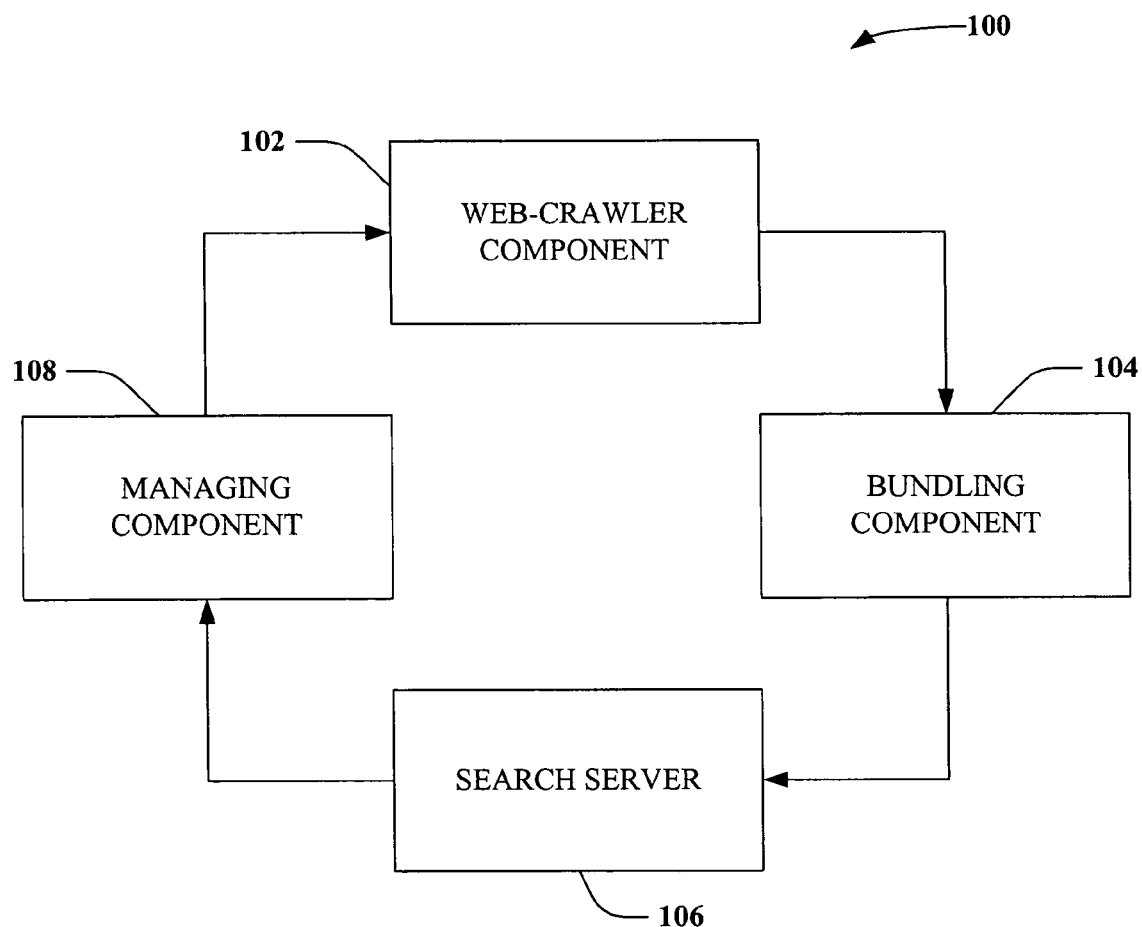
FIG. 1 is an illustration of a web-crawling system 100 in accordance with an aspect of the present invention.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the term "component" is intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a computer component. One or more components may reside within a process and/or thread of execution and a component may be localized on one computer and/or distributed between two or more computers. A "thread" is the entity within a process that the operating system kernel schedules for execution. As is well known in the art, each thread has an associated "context" which is the volatile data associated with the execution of the thread. A thread's context includes the contents of system registers and the virtual address belonging to the thread's process. Thus, the actual data comprising a thread's context varies as it executes.

The present invention provides improved systems and methods of maintaining an index of web documents. It can also be utilized to retrieve and maintain data for other types of information. Traditional web-crawlers have certain shortcomings which are alleviated by the present invention. Each client (e.g., a machine of any person who accesses the Web) stores local information, so it can learn whether a web page has changed since the last time the client visited it. If it has changed, the client can then communicate this information to the search engine. Likewise, a server can use information about web pages visited by clients to find pages currently unknown to the server. Effectively finding documents and maintaining current knowledge about those documents is an extremely important task for both intranet and Internet search. The present invention can also be utilized in contexts such as intranet searches, where crawling pages and keeping page information fresh on a server is an even greater challenge.

An important component of a search engine (for the Internet, an intranet, or otherwise) is a data- or web-crawler. The web-crawler performs two primary tasks: finding unknown documents to be indexed by the search engine and trying to ensure it has up-to-date knowledge about each known document. Both of these tasks are difficult and (along with page rank quality) are among the most important and visible quality differentiators among search engines. Document crawlers are typically based on a server model. A search engine crawls the Web by topological search. Beginning with a seed set of known web pages, the crawler follows links from those pages and can thereby find all web pages that are connected via a path (set of URL references) from the seed set. To ensure the search engine has up-to-date knowledge of a document collection, the crawl has to be repeated frequently. Since the crawler revisits web pages each time it crawls, it can learn how frequently a page (or subpage) changes, and recrawl certain pages more frequently than others based on, for example, historical frequency of change, predicted future change(s), etc.

There are a number of weaknesses with the current server-based crawling paradigm. For example, a search engine can only learn about a change to a document (e.g., a content change, or a page that no longer exists, etc.) when the crawler happens to revisit the page. Conventional systems typically cannot adjust the frequency with which they crawl frequently changing pages with any appreciable efficiency. The present invention offers systems and methods for maintaining up-to-date knowledge about known documents in a way that remedies the above mentioned weaknesses.

As used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic-that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

FIG. 1 is an illustration of a system 100 that provides predictive approach to prioritizing pages for crawling. The system 100 comprises a web-crawling component 102 that crawls web pages in order to discover and update the pages in a catalogue of possible search results. The web-crawling component 102 is operably associated with a bundling component 104 that prioritizes web pages into sets, or "chunks," based on the utility of the pages. The bundling component 104 is further operably associated with a search server 106 that contains subsets of items, such as URLs, that can be selected by a managing component 108 for crawling by the crawling component 102. In this manner, the search server 106 can be crawled by the crawling component 102 and continuously reprioritized via the bundling component 104.

The system 100 facilitates predicting when a web page will change in order to expedite crawling of the web page upon change so that the search server can be updated without substantial delay. Such predictions can be made by assessing the probability that a page has changed since the last time it was crawled. In order to determine the probability that a web page has changed, historical information related to the specific pages in question can be assessed (e.g., the number of times the page has changed in the past, the magnitude of the change(s), etc.), as well as historical data pertaining to changes in other pages. In addition, one can use features of the URL of the page (e.g. whether the URL ends with ".html", ".com", etc.), features of the document or HTML (e.g., whether it contains a table, a photo, etc.), features of the words on the page, and/or HTTP status information obtained when downloading the page.

The managing component 104 can build a statistical model to predict probabilities associated with web page changes. Such statistical model can be, for example, logistic regression, a probabilistic version of a support vector machine, etc. To build a statistical model, the managing component 106 can collect training data germane to the timing of web-pages change (and, in a more general sense, other aspects that describe possible outcomes, such as the number of page-views, the degree of change, etc.) for a set of pages, as well as a specific history of when each page changed. The managing component 106 can further construct a training set by extracting features for each page utilizing the contents of the page, the change history for the page, its URL, the HTTP status messages associated with downloading the page, etc. In the case of prediction for a "new page" scenario, the managing component 104 can use a subset of this information (e.g. wherein history information is unavailable).

According to another aspect of the invention, the system 100 can use the prediction of when a web page will change to support a decision-theoretic to selectively downloading pages to maximize the efficiency of the crawling component 102 in discovering and updating changed web pages. A variety of factors can be employed to facilitate the decision-theoretic choice of an appropriate time to crawl a specific page. For example, such factors can comprise a set of possible actions, A; a set of possible outcomes, O; a probability that a particular outcome will occur, Pr; and a utility factor associated with each outcome, Utility(O), which captures the value of the particular outcome. Such factors can be utilized to select a best action via applying the Maximum Expected Utility principal. For example, an action is selected, a∈A, which maximizes the value of:

$$\sum_{o \in O} Pr(o \mid a) \times Utility(o)$$

The set of all actions A can comprise all possible subsets of pages that can be downloaded from the search server 106. Each single page can be considered independently from other pages in order to simplify choosing an action, and sets of page(s) can be chosen based on their individual ranking. This approach facilitates making decisions regarding which pages to update in the current time period and mitigates problems associated with the time required to crawl every page, which can be on the order of weeks or months.

Several outcomes O are possible for each chosen action. For example, an outcome can be a decision not to download a page, a failed attempt to download a page, a download of an unchanged page, and/or a download of a changed page. Possible outcome variants can be expanded to comprise other aspects such as, for example, the number of times a page might be viewed in an upcoming time period (e.g., day, week, month, etc.), the magnitude of change(s) in the page, etc.

The utility function weights the value of each outcome, such that the value of a page can be a function of the importance of the page, the number of times the page is viewed in a given time period, the number of clicks on the page, the specific links clicked on the page, the degree of change in a changed page, various business rules (e.g., crawl every page once in each 4-week period, crawl a page at most once per day, etc.), and/or any other suitable aspect associated with the importance of the page.

Determining the probability that a given outcome will occur is of paramount importance. A basic object of web-crawling is to assess the probability that a page has changed since the last time it was crawled. In order to accurately predict the probability that a particular outcome will occur, the managing component can employ historical data pertaining to the specific pages under review, as well as the history of changes to other pages, etc.

Selectively crawling such a vast expanse of pages necessitates a strategy for determining which pages to crawl in the current and future time periods. For example, if the page under review is a new page, then no historical data is available to the managing component 108 upon which to base a prediction of page-change probability. According to this example, the managing component can rely on page contents, the URL of the page, etc. If the page is not new, then the managing component can inspect available change history of the page in addition to the information described above in reference to the new page. Additionally, decision theory can also facilitate crawling a new page more frequently in order to augment and/or obtain information about the rate in which the page changes. For example, if a probability predictor indicates that it is uncertain in its prediction of when the page will change, the decision-theoretic can choose to be cautious and crawl the page frequently, thus reducing the risk that the page will become unacceptably out of date and providing more historical data, which can increase the certainty of future probability predictions.

Additionally, the managing component 108 can instruct the crawling component 102 to perform category-specific crawling via employing a category such as, for example, "baseball," "stock prices," etc. In this manner, the crawling component 102 can selectively crawl pages containing indicia of a particular category. Similarly, the management component 108 can instruct the crawling component 102 to perform query-specific crawling (e.g., "Australian Open," "StockX," etc.). Such examples represent subjects wherein information changes frequently and, consequently, web pages related to the subjects will be updated frequently (e.g., scores, prices, etc.). Such query-specific crawling can enhance the efficiency of web page change prediction. Furthermore, outcome space can be expanded to comprise the number of times a page will be viewed in a future time period, the number and/or magnitude of page changes, etc.

Figure 2:
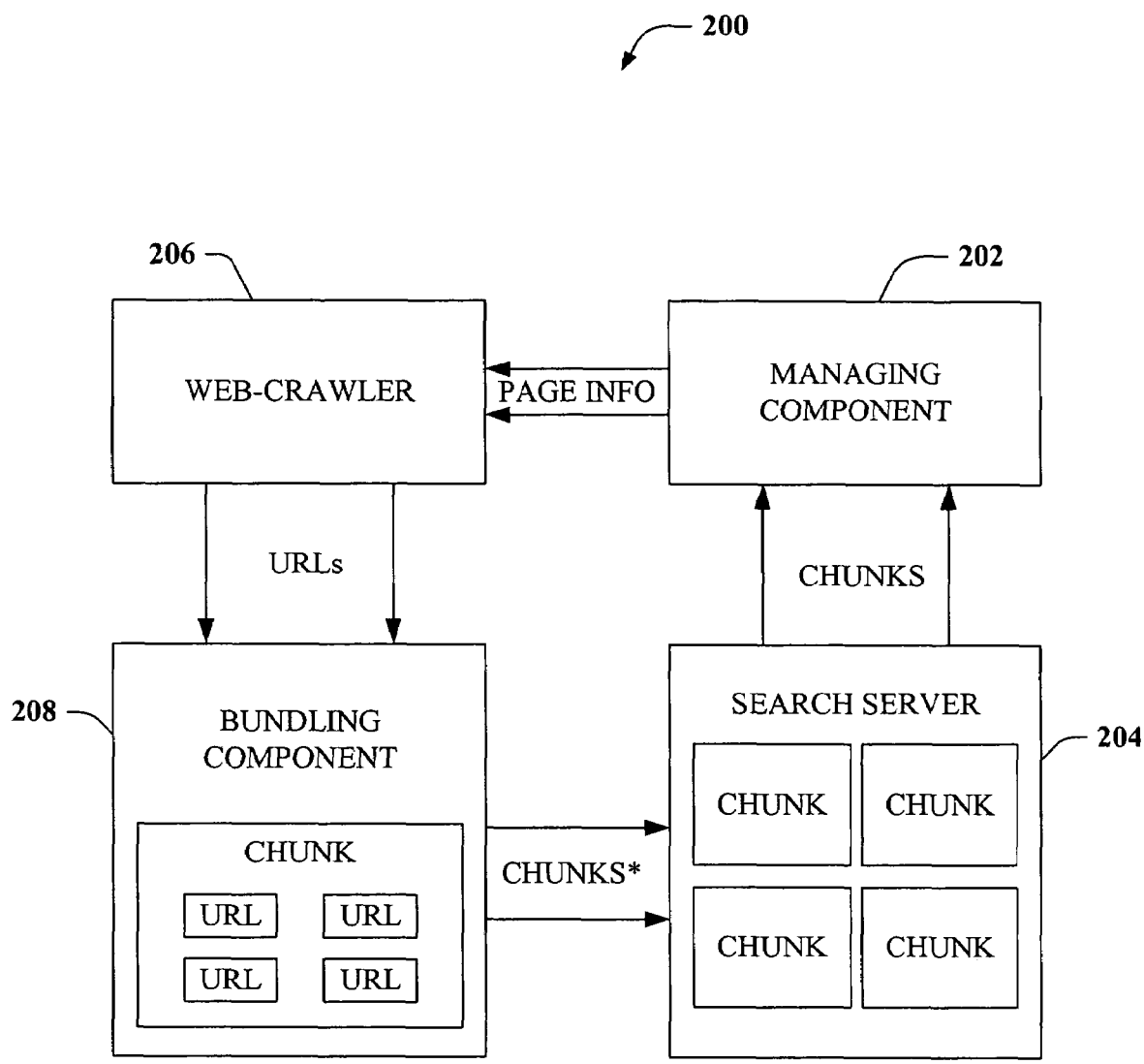
FIG. 2 is an illustration of a web-crawling system 200 in accordance with an aspect of the present invention.

FIG. 2 is an illustration of a system 200 that bundles URLs according to their utility, in accordance with an aspect of the invention. A managing component 202 can download chunks of web pages from a search server 204. A chunk can be, for example, 65,536 pages, 32,768 pages, or some other number of web pages grouped together. The managing component 202 gleans information from subsets of the downloaded chunks, each subset comprising at least one web page. Information gleaned by the managing component 202 can comprise, for example, page content, URL, HTTP header information, historical information, etc. The managing component 202 can then base a prediction of the probability that a specific page or subset of pages has changed since a previous crawl or will change before a scheduled subsequent crawl and instruct the web-crawler 204 to take an action to facilitate a desired outcome (e.g., crawl the page if change is imminent, ignore the page until scheduled crawl because change is not likely, etc.) Additionally, predictions can be made regarding the timing of a page change and/or probability that a page will change on a specific future date or did change on a specific past date. Such predictions can be employed to provide a distribution curve expressing the probabilities that a page will change on one of several dates. Such predictions can be definitive of which chunk a page should be part.

Once the selected pages have been crawled and pertinent information has been updated, a bundling component 208 can receive URL information from the web-crawler 206 and repackage the URLs into new chunks (CHUNKS*) based on predictions of, for example, when page(s) will change. The bundling component 208 can then restore the repackaged CHUNKS* to the search server 204.

Figure 3:
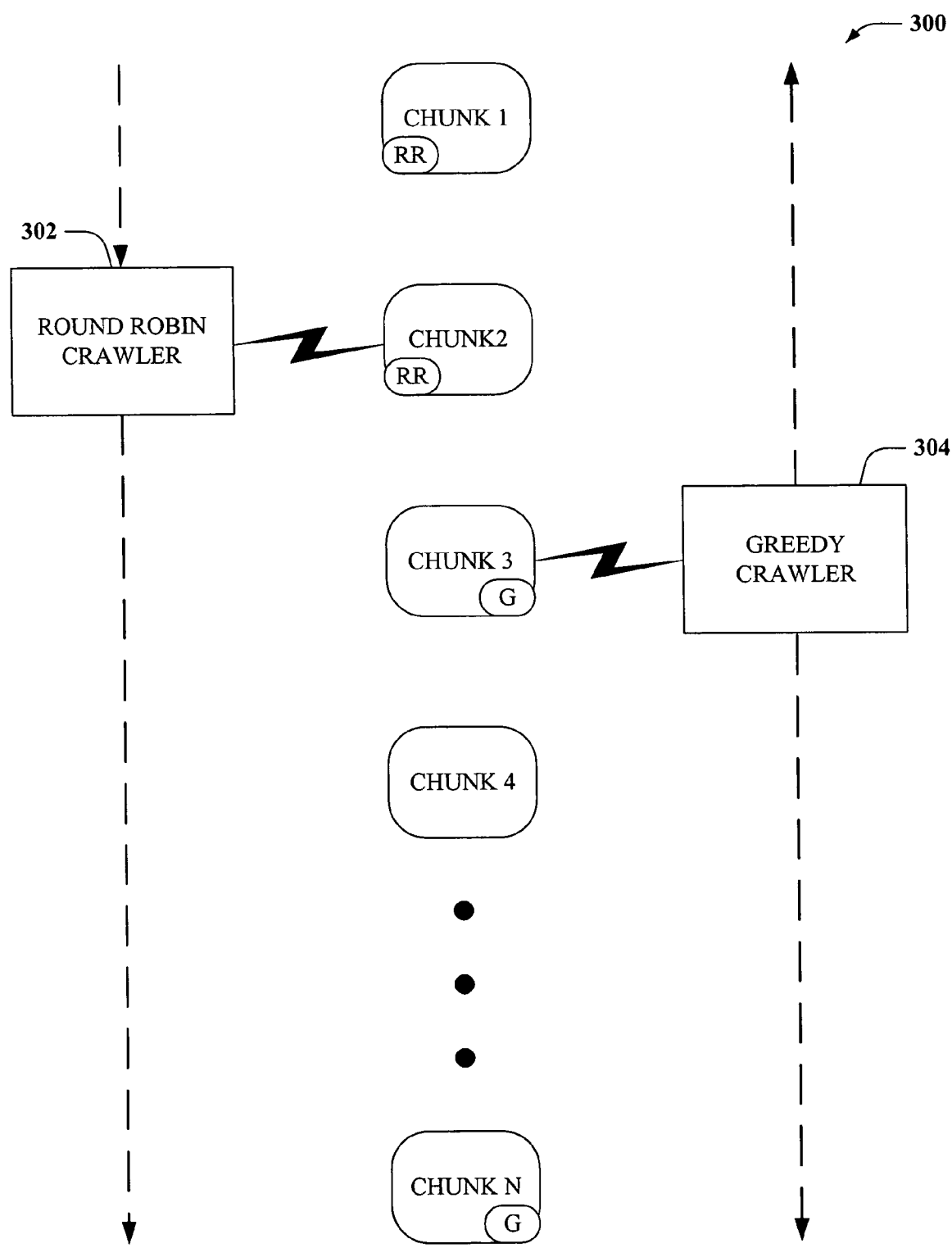
FIG. 3 is an illustration of a web-crawling system 300 in accordance with an aspect of the present invention detailing cooperative web-crawling components.

FIG. 3 is an illustration of components of the web-crawler described herein in accordance with an aspect of the invention. A Round Robin component 302 is illustrated as it crawls listed pages, 1-n, individually from top to bottom, as indicated by the hashed arrows pointing vertically downward. The Round Robin component thus ensures that every page will be crawled within the specified crawling period (e.g., 28 days), which in turn guarantees that no page will be outdated by more than 28 days. It is to be understood that the crawling period can be any sufficient time period for crawling a search server and is not limited to a period of 28 days.

According to FIG. 3, the Round Robin component 302 has crawled Chunk1 (as illustrated by the "RR" indicium in the lower left corner of Chunk1) and is in the process of crawling Chunk2. Upon completion of the crawl of Chunk2, the Round Robin component 302 can proceed to crawl Chunk3 to determine the content thereof. However, a Greedy component 304 is in the process of crawling Chunk3, and, therefore, the Round Robin component 302 can receive and indication that Chunk3 does not require crawling. Thus, the next chunk the Round Robin component 302 will crawl is Chunk4. It will be noted that the Greedy component 304 has already crawled the ChunkN, and that the hashed vertical arrows associated with the Greedy component extend in both directions along the list of chunks in the set to illustrate that the Greedy component 304 is not bound by the order of the chunks when crawling. Rather, the Greedy component 304 can select chunks (which can be individual pages) to crawl based on a best score such as, for example, a predictive score (e.g., a maximum average probability of having changed since the last crawl), a utility score (e.g., the maximum average utility), and/or a decision-theoretic score (e.g., a maximum expected utility), etc. In this manner, the Round Robin component 302 can ensure that all chunks are crawled within a prescribed time period while the Greedy component ensures that chunks with the highest utility and/or change-potential scores are searched before those with lower scores. Furthermore, the ability of the Round Robin component 302 to recognize that a chunk has been crawled by the Greedy component 304 during the current crawling period reduces the time required to crawl a chunk, search server, etc. Algorithms describing the manner in which the Round Robin component 302 and Greedy component 304 cooperate are described infra, with respect to FIGS. 7-9.

Figure 4:
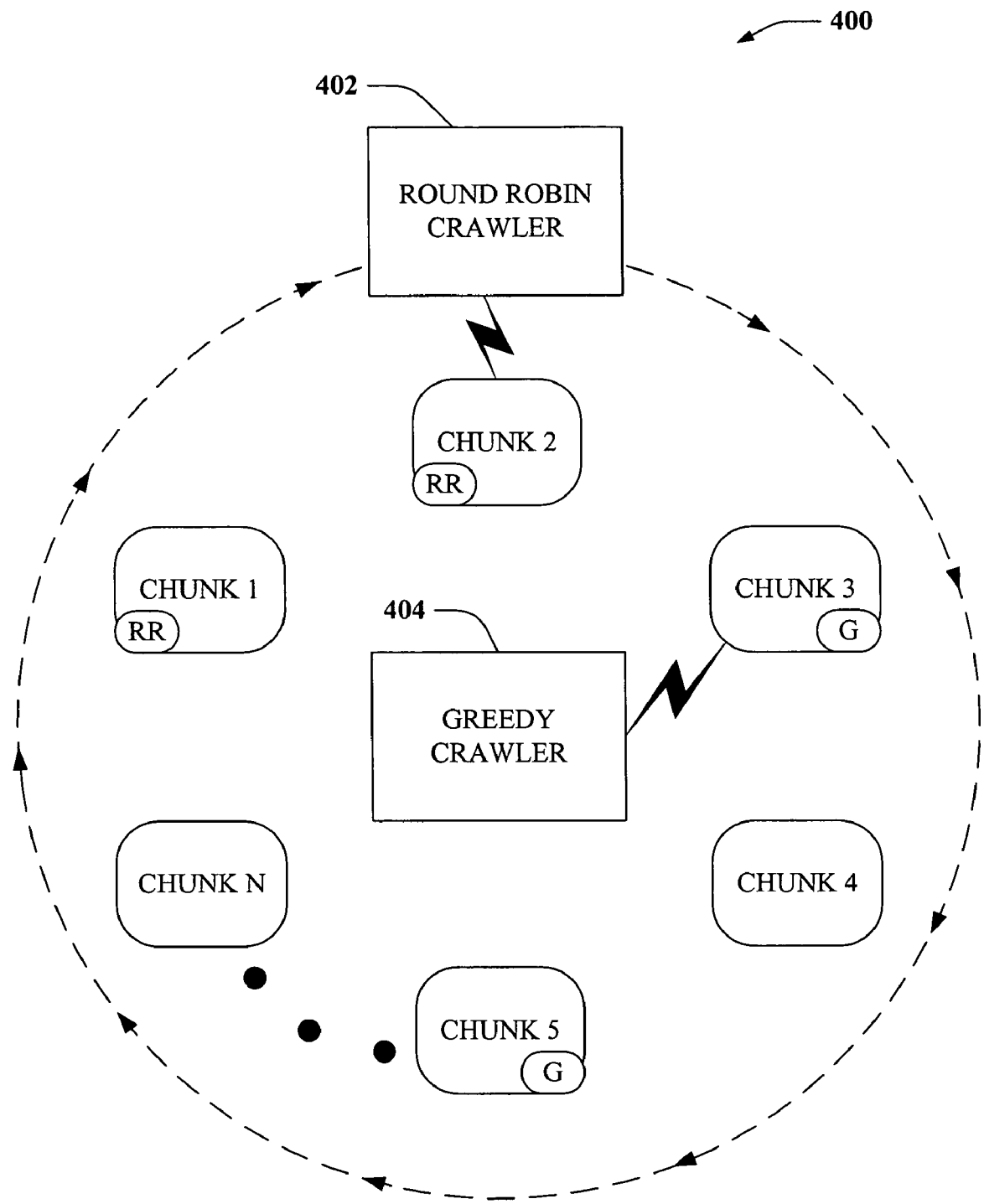
FIG. 4 is an illustration of a web-crawling system 400 in accordance with an aspect of the present invention detailing cooperative web-crawling components.

FIG. 4 is an illustration of components of the web-crawler described herein in accordance with an aspect of the invention. The figure depicts a Round Robin component 402 at the perimeter of a chunk (e.g., subset of items, or pages, etc.) in order to illustrate the ordered crawling of the chunk performed by the Round Robin component 402. As illustrated, the Round Robin component 402 has crawled Chunk1 and is in the process of crawling Chunk2. Chunks 1 and 2 are shown with an "RR" in the lower right corner to indicate that each chunk has been, or is currently being, crawled by the Round Robin component 402. A Greedy component 404 is illustrated at the center of the chunks in order to more clearly demonstrate that the Greedy component 404 has access to all chunks regardless of their Round Robin ordering. For example, the Greedy component is currently crawling Chunk3 as indicated by the communications link connecting the Greedy component 404 to Chunk3. It will be noted, however, that Chunk5 has already been crawled by the Greedy component 404, despite the fact that Chunk5 is positioned after Chunk3. According to this example, the Greedy component 404 has determined Chunk5 to have a higher score (e.g., predictive, utility, and/or decision-theoretic, etc.) than Chunk3, and therefore crawled Chunk5 before Chunk3. The Round Robin component 402 can attempt to crawl Chunk3 upon completion of Chunk2, but can recognize that Chunk3 has been crawled by the Greedy component 404. Thus, the next chunk that the Round Robin component will crawl will be Chunk4.

While, for purposes of simplicity of explanation, the one or more methodologies shown herein, e.g., in the form of a flow chart, are shown and described as a series of acts, it is to be understood and appreciated that the present invention is not limited by the order of acts, as some acts may, in accordance with the present invention, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the present invention.

Figure 5:
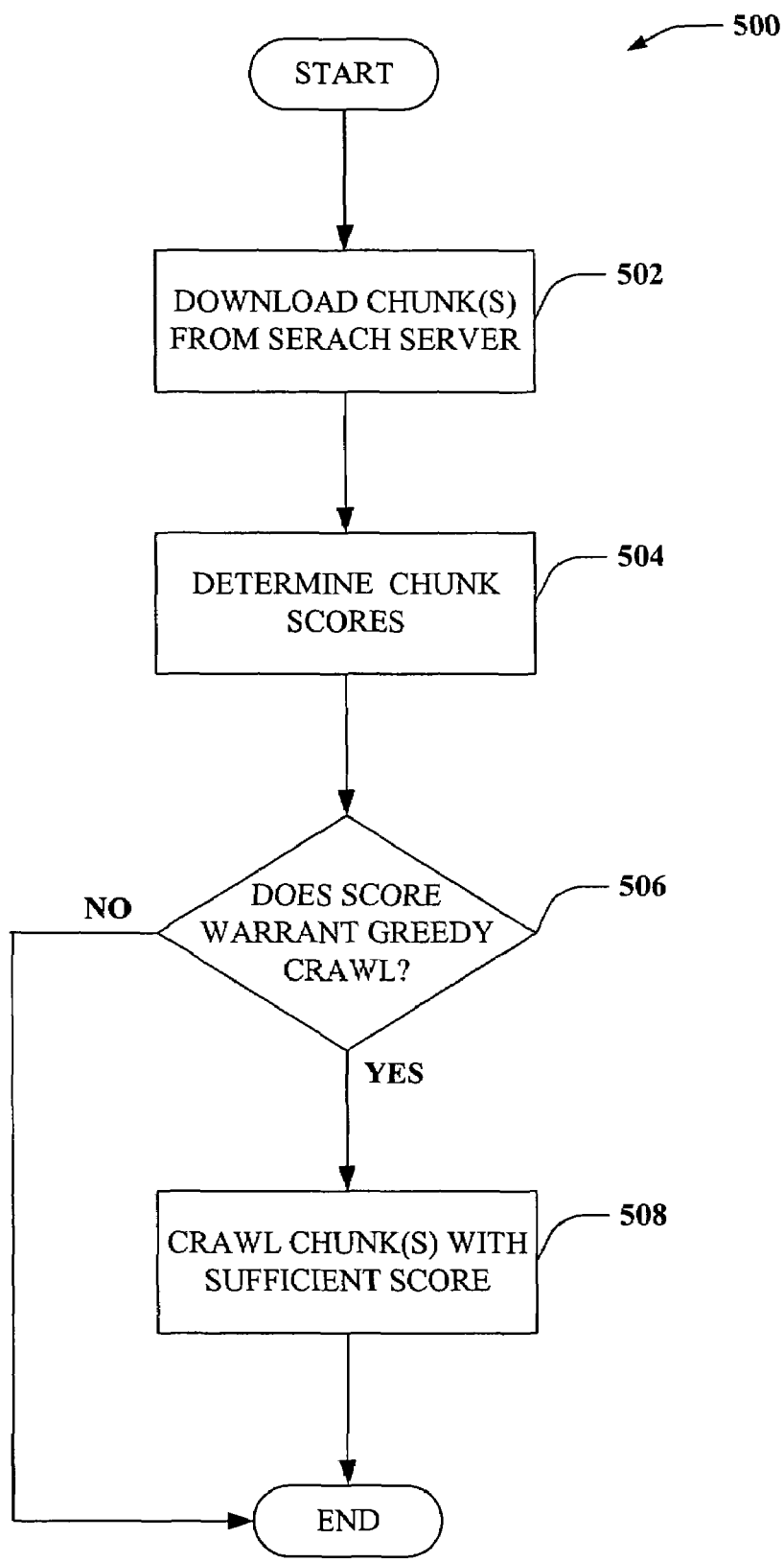
FIG. 5 is an illustration of a methodology 500 in accordance with an aspect of the present invention.

FIG. 5 is an illustration of a methodology for predictive web-crawling via a Greedy algorithm in accordance with an aspect of the invention. At 502, chunks are downloaded from a search server to be crawled. At 504, chunk scores are determined to facilitate a determination of which chunks to crawl. For example, a chunk score can be a predictive score (e.g., a maximum average probability of having changed since the last crawl, etc.), a utility score (e.g., the maximum average utility, etc.), and/or a decision-theoretic score (e.g., the maximum expected utility, etc.). At 506, a determination can be made regarding whether chunk scores as to whether a given chunk's score warrants a Greedy crawl (e.g., whether the crawler should crawl ahead of schedule, etc.). If the score of a given chunk does not warrant a Greedy crawl, then the chunk will not be immediately crawled. If the chunk's score is sufficiently high to warrant a Greedy crawl, then at 508, the chunks with sufficient scores can be crawled.

Figure 6:
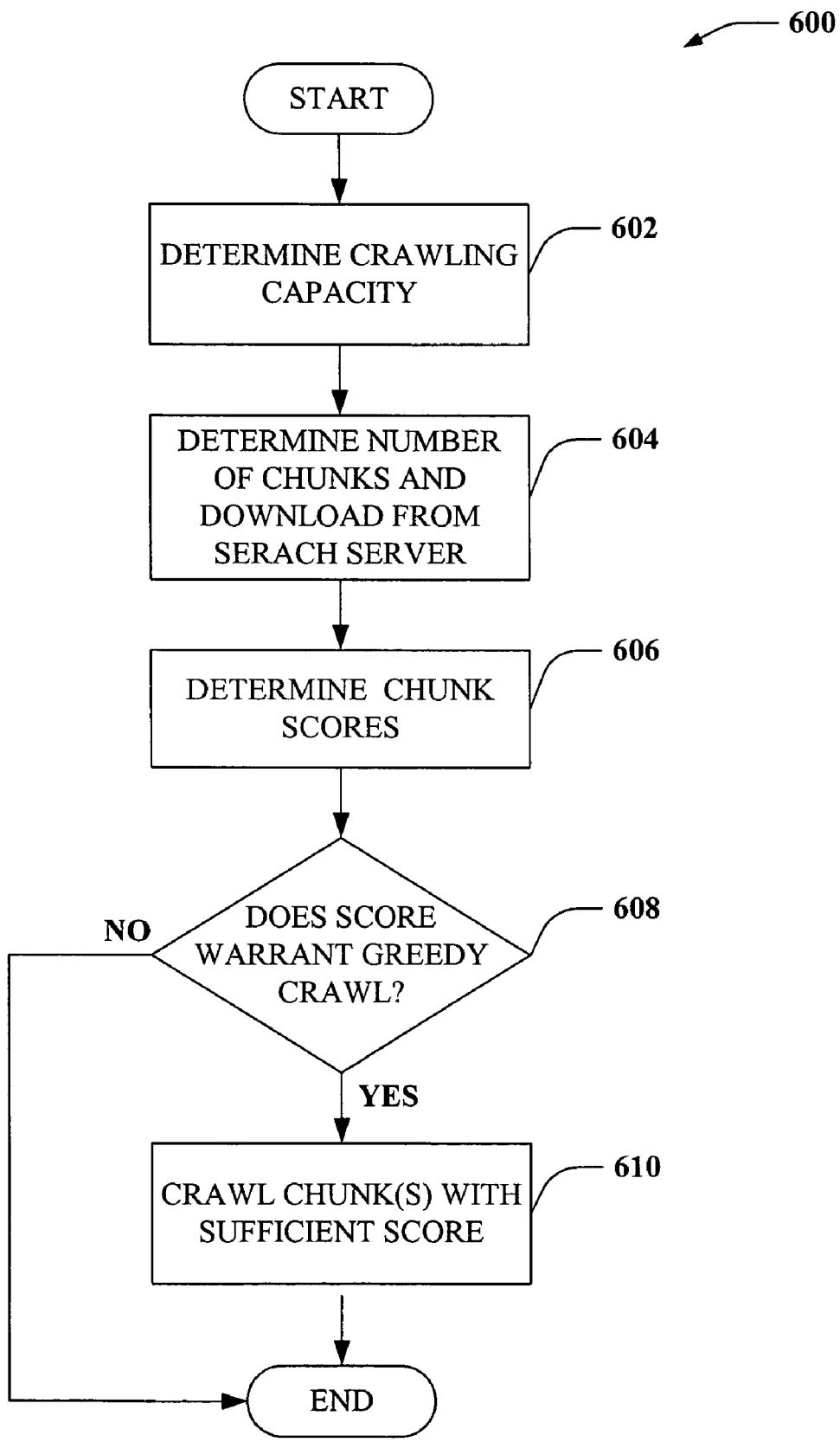
FIG. 6 is an illustration of a methodology 600 in accordance with an aspect of the present invention.

FIG. 6 illustrates a methodology in accordance with an aspect of the present invention in which the number of chunks chosen for crawling can be based on, for example, crawling capacity. At 602, the crawling capacity of a web-crawler is determined (e.g., a maximum number of chunks, M, that can possibly be crawled is assessed). At 604, chunks can be downloaded from a search server for potential crawling. At 606, chunk scores (e.g., predictive, utility-based, and/or decision-theoretic) can be determined to facilitate a determination of which chunks to crawl. At 608, a determination can be made regarding chunk scores and whether a given chunk's score warrants a Greedy crawl (e.g., whether the crawler should crawl ahead of schedule, etc.). If the score of a given chunk does not warrant a Greedy crawl, then the chunk will not be immediately crawled. If the chunk's score is sufficiently high to warrant a Greedy crawl, then at 610, the chunks with the best scores can be crawled.

Figure 7:
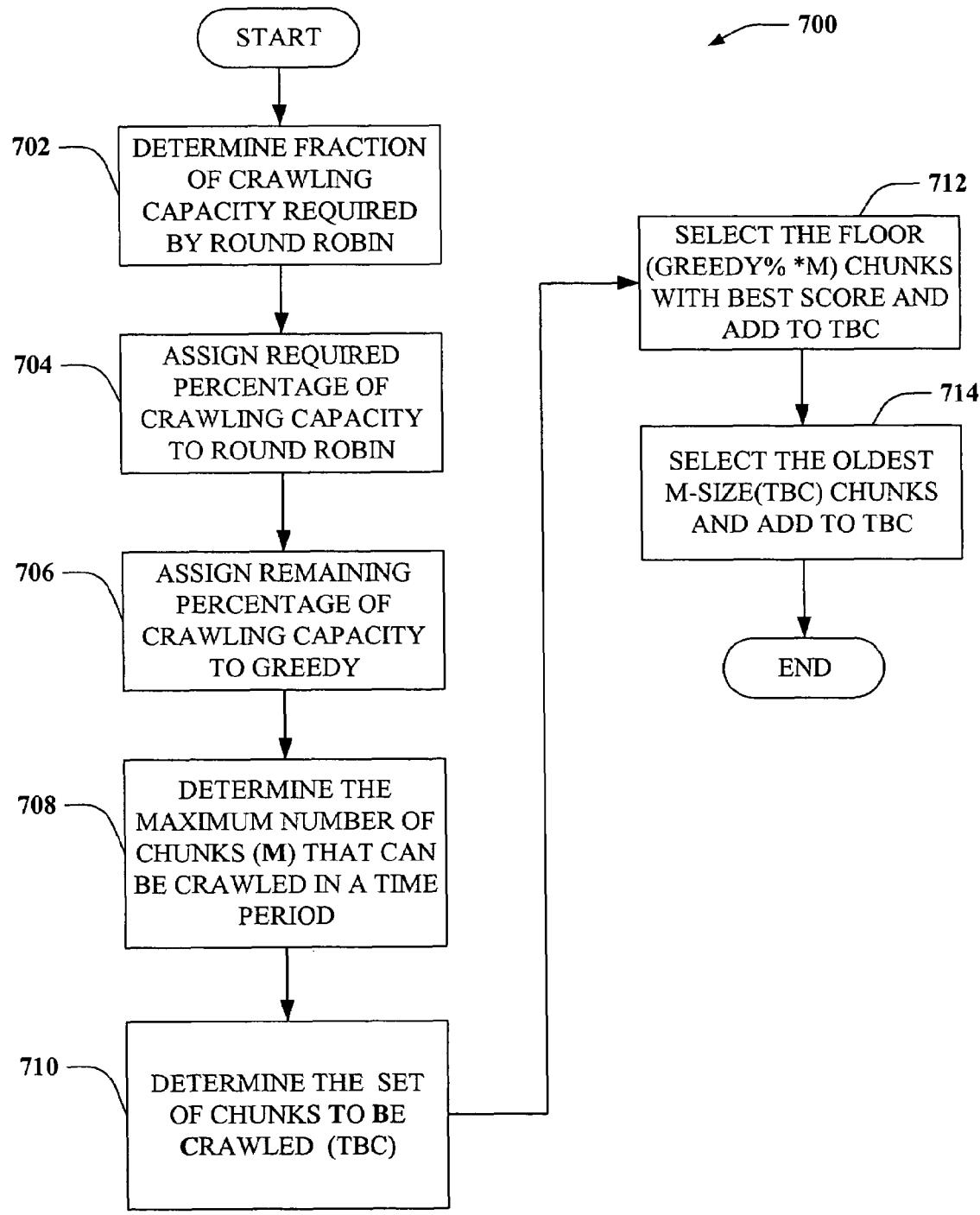
FIG. 7 is an illustration of a methodology 700 in accordance with an aspect of the present invention.

FIG. 7 is an illustration of a methodology 700 in accordance with an aspect of the present invention in which a Greedy algorithm is employed in conjunction with a Round Robin algorithm. This aspect of the invention employs the Greedy algorithm to choose the chunks via utilizing predictive, utility-based, and/or decision-theoretic scores while guaranteeing that all chunks can be crawled (in the future) before they are D days old. At 702, a determination is made regarding what percentage of the crawling capacity is needed by the Round Robin (rr %) in order to guarantee that no URL is more than D days out of date (e.g., to guarantee that all pages will be crawled at least once within D days). For example, if 50% of available crawling capacity can, using the Round Robin algorithm, guarantee that no chunk will be more than 28 days out of date, then the Round Robin algorithm can crawl chunks according to their deadlines. Deadlines can be determined, for instance, by assessing the last date a chunk was crawled. For example, if chunk A was crawled 14 days ago, then its deadline is 14 days in the future. If chunk B was crawled 7 days ago, then its deadline is 21 days in the future. Thus, chunk A will be crawled before chunk B. According to this example, 50% of crawling capacity can be assigned to Round Robin at 704.

At 706, the remainder of crawling capacity (1-rr %) can be assigned to the Greedy algorithm (g %) for Greedy crawling. Then, at 708, a determination of the maximum number of chunks (M) that can be crawled in a time period can be determined, for example, by assessing the size of the chunks to be selected and the length of the time period, where crawling speed is a known value. At 710, a determination can be made regarding which particular chunks are to be crawled (TBC). Next, at 712, a floor is selected for the number of chunks with best scores to be added to TBC, using the formula g % *M. For example, if g % is 55%, and M is equal to 5, then g % *M equals 2.75, and the floor will be 2. Finally, at 714, a selection is made of the oldest chunks via the formula M-size(TBC), which chunks are added to TBC. In this manner, chunks are selected for Greedy crawling while the Round Robin algorithm ensures that all chunks will be crawled during a given time period.

Figure 8:
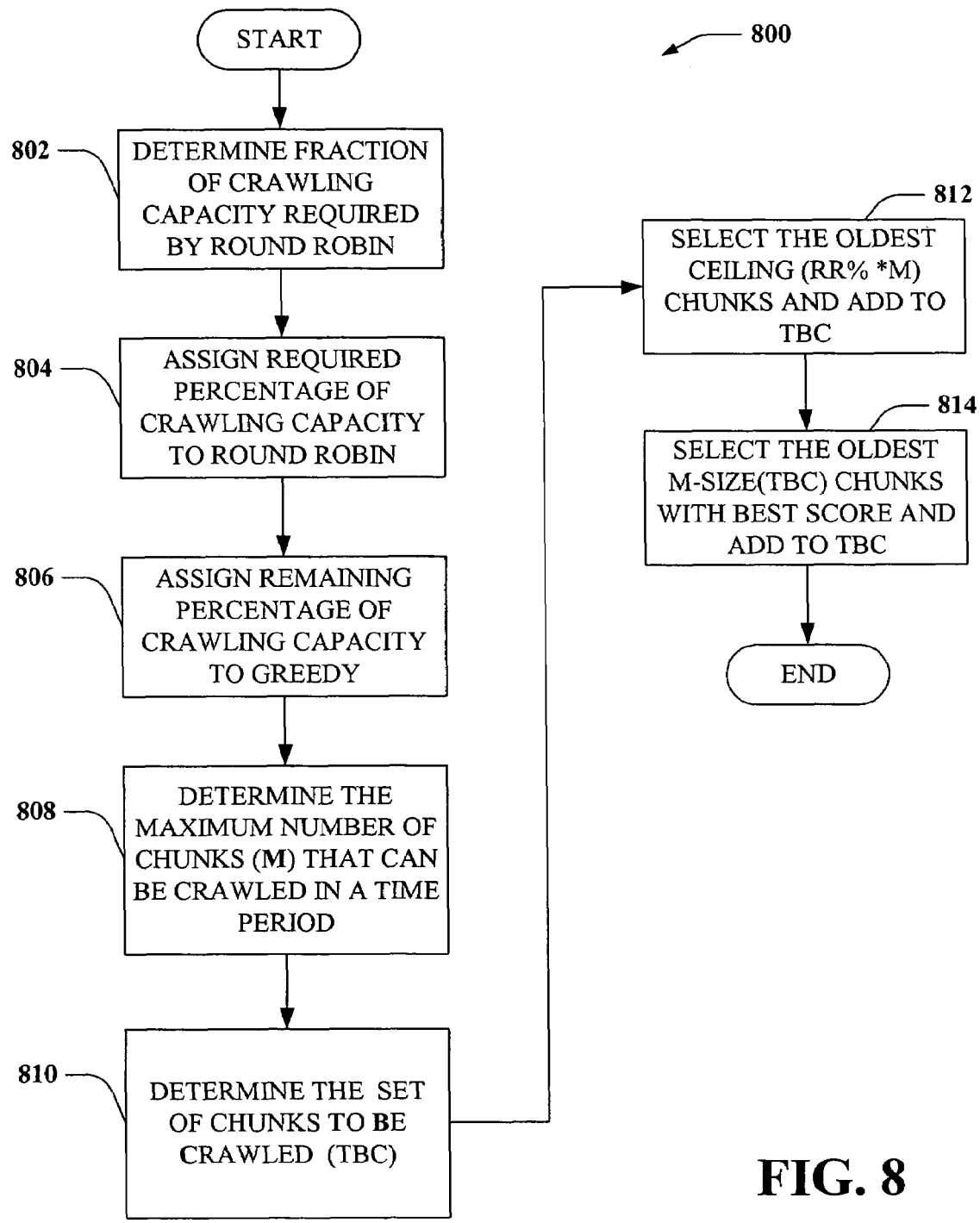
FIG. 8 is an illustration of a methodology 800 in accordance with an aspect of the present invention.

FIG. 8 is an illustration of a methodology 800 in accordance with an aspect of the present invention in which a Greedy algorithm is employed in conjunction with a Round Robin algorithm. At 802, a determination is made regarding what percentage of the crawling capacity is needed by the Round Robin (rr %) in order to guarantee that no URL is more than D days out of date (e.g., to guarantee that all pages will be crawled at least once within D days). Crawling capacity can then be assigned to Round Robin at 804. At 806, the remainder of crawling capacity (1-rr %) can be assigned to the Greedy algorithm (g %) for Greedy crawling. Then, at 808, a determination of the maximum number of chunks (M) that can be crawled in a time period can be determined, for example, by assessing the size of the chunks to be selected and the length of the time period, where crawling speed is a known value. At 810, a determination can be made regarding which particular chunks are to be crawled (TBC).

At 812, a ceiling is selected based on the formula rr % *M for a number of chunks to be added to TBC. For example, if rr % equals 53% and M is equal to 10, then rr % *M equals 5.3, and the resultant ceiling value will be 6. At 814, the oldest M-size(TBC) chunks with best scores (e.g., predictive, utility, and/or decision-theoretic, etc.) are selected and added to TBC. In this manner, chunks are selected for Greedy crawling while the Round Robin algorithm ensures that all chunks will be crawled during a given time period.

Figure 9:
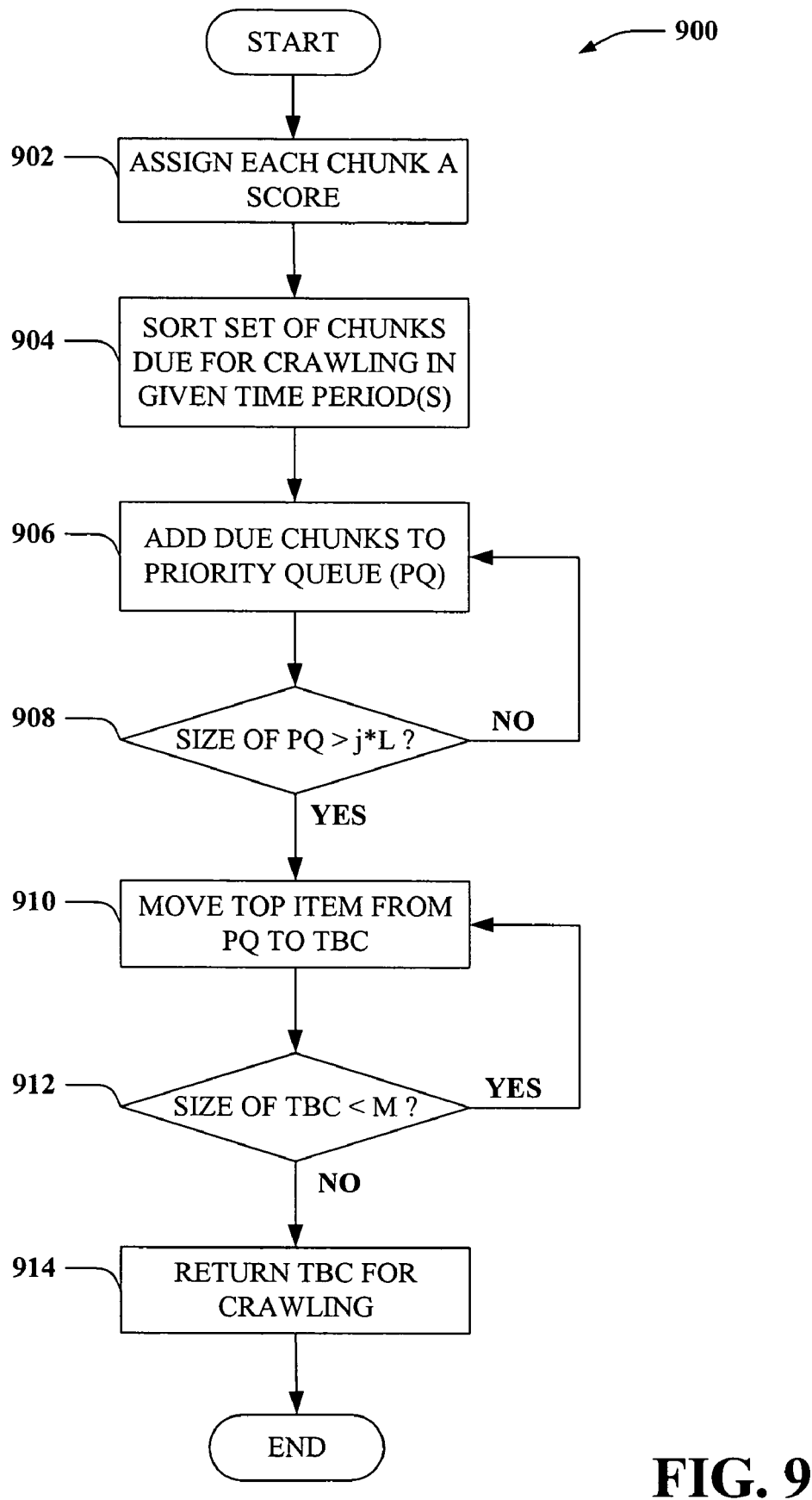
FIG. 9 is an illustration of a methodology 900 in accordance with an aspect of the present invention.

FIG. 9 is an illustration of a methodology 900 in accordance with an aspect of the present invention in which a Greedy algorithm is employed in conjunction with a Round Robin algorithm. It is possible that Round Robin can finish crawling all the chunks sooner than it needs to when employing the above described methodologies. This can occur because Greedy is also crawling chunks. For example, if all the chunks need to be crawled in within a 28-day period, employing methodology 700 or 800 can result in all the pages in fact being crawled in 20 days. To account for this potential occurrence, the following algorithm is set forth in detail.

Let C be the set of chunks and C0, C1, ..., Cn is a partition of C where Cj are the chunks that are due in j time periods and Nj be the number of chunks in Cj. The number of members in the partition (e.g., n) of C is a function of the maximum out-of-date allowance. Let L be the maximum number of chunks that that are desired be crawled in a time period (e.g., to guarantee that no chunk is more than D days out of date), and let M be the maximum number of chunks that can possibly be crawled in a time period, where M is greater than or equal to L. Let TBC be the set of chunks to be crawled in the current time period. Note that, in the "for" loop below, R is used to store the number of chunks required to be crawled after the current day with due date <j, and PQ is a priority queue of chunks prioritized by the score for the chunk.

```
Assign each chunk a score (either predictive, utility or
  decision-theoretic);
TBC = C0;
Initialize PQ = { };
For j = 1 to n
{
   Add chunks in Cj to priority queue PQ;
   While (size(PQ) > j * L) //exceeded capacity, therefore
                             meet capacity by shifting item(s)
   {
     Move top item from PQ to TBC
   }
}
   // Choose chunks to fill up crawl capacity
While(size(TBC) < M)
{
   Move top item from PQ to TBC
}
   Return TBC;
}
```

Still referring to FIG. 9, at 902 each chunk C0 . . . Cn is assigned a score as described herein supra (e.g. predictive, utility, and/or decision-theoretic). At 904, chunks are sorted according to due dates (e.g., chunks due to be crawled in j time are comprised by the set Cj, which has Nj chunks). At 906, chunks in Cj are added to a priority queue (PQ). Then, at 908, a determination of the size of PQ is made with regard to a value j*L, where L is the maximum desired number of chunks to be crawled. If PQ is smaller than j*L, then such information can be employed to provide feedback and the method can revert to 906 for further addition of chunks. If PQ is greater than j*L, then at 910 the top chunk in PQ can be moved to a set of chunks to be crawled (TBC). At 912, a determination is made regarding the size of TBC with respect to M, where M is the maximum number of chunks that can possibly be crawled in a time period. If TBC is less than M (e.g., there is still room in TBC for more chunks, etc.) then the method can revert to 910 to move then the next top chunk in PQ to TBC. If it is determined at 912 that the size of TBC is not less than M, then at 914, TBC can be returned to the web-crawler for crawling. In this manner, chunk status and crawling deadlines can be continuously updated in order to capitalize on an occurrence wherein Round Robin and Greedy algorithms cooperatively perform a crawl in less time than is required.

It is to be appreciated that the present invention can employ feedback loop(s) in conjunction with web page change prediction. For example, in addition to the regular crawling described above, a sample of URLs can be selected and crawled at regular intervals, regardless of the probability of change, to provide training data for learning probability predictors and for tuning crawling strategies. Such can also provide data that can facilitate testing crawling strategies, building metrics for such testing, and validating crawling methods. For instance, a sample size of 64,000 URLs can be sufficiently large to be useful, and samples need not be uniform across all URLs, but rather can be weighted by value. According to one aspect, sample value can be determined by picking URLs from a result set sent to users who use a given search engine. Furthermore, available click-through information can be utilized to facilitate determining suggested URLs on which users click in order to weight such URLs more than others samples in a result set.

The crawling interval can be matched to the maximum frequency of crawling episodes in the production environment (e.g., daily, hourly, etc.). It is to be appreciated that the present invention is not limited by such intervals. Additionally, random crawling can be useful because it is independent of the production crawl strategy.

Pages in the sample can be crawled normally, too. According to this aspect, URLs need not be moved to this sample, but rather can be copied thereto. Periodically, (e.g. every month, two months, etc.), a new sample can be taken. Alternatively, URLs can be traded in and out smoothly so that over the course of a month (or two, etc.), the sample will be new compared to the preceding month. According to this aspect, a greater amount of data about each URL can be retained than with regular crawling. By way of example, regular crawling might only permit retention of the number of times a web page changed, the number of times it was the same, and/or the average interval between crawls of the web page. However, the feedback protocols described herein can permit retention of information related to, for example, whether a web page changed on a given day. Furthermore, for each URL in the sample, records can be maintained regarding its initial conditions (e.g., the information about a particular page as gleaned during regular crawl). Thus, a web-crawling simulation is not required to assume that each URL in a sample is a new URL. In this manner, web-crawling strategies can be enhanced to increase the freshness of pages with a higher rate of change relative to pages that change only infrequently, which in turn facilitates employing significantly fewer machines to produce significantly fresher results.

Figure 10:
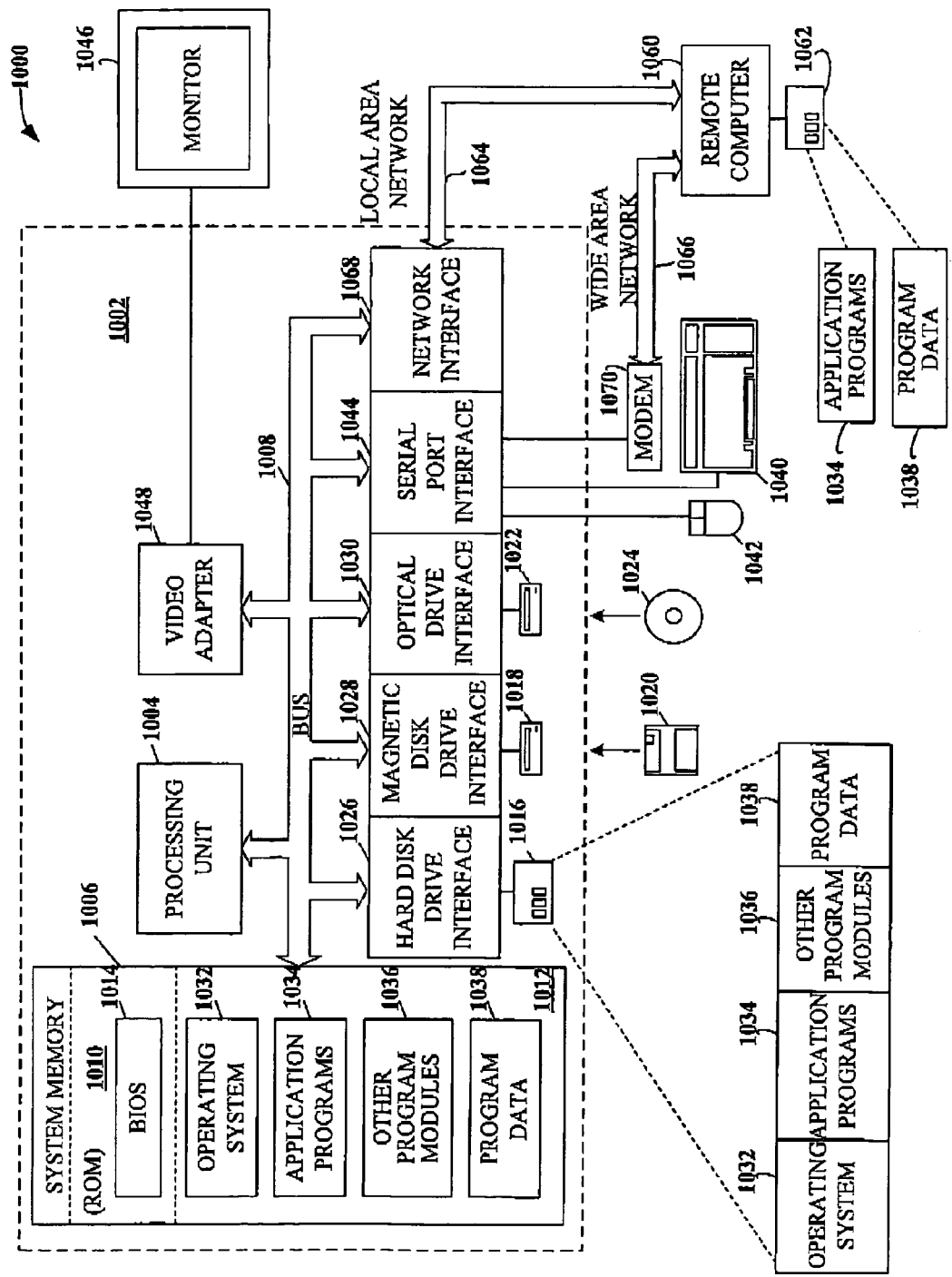
FIGS. 10 and 11 are illustrations of exemplary computing environments 1000 and 1100 in accordance with an aspect of the present invention.

In order to provide additional context for implementing various aspects of the present invention, FIG. 10 and the following discussion is intended to provide a brief, general description of a suitable computing environment 1000 in which the various aspects of the present invention may be implemented. While the invention has been described above in the general context of computer-executable instructions of a computer program that runs on a local computer and/or remote computer, those skilled in the art will recognize that the invention also may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based and/or programmable consumer electronics, and the like, each of which may operatively communicate with one or more associated devices. The illustrated aspects of the invention may also be practiced in distributed computing environments where certain tasks are performed by remote processing devices that are linked through a communications network. However, some, if not all, aspects of the invention may be practiced on stand-alone computers. In a distributed computing environment, program modules may be located in local and/or remote memory storage devices.

As used in this application, the term "component" is intended to refer to a computer-related entity, either hardware, a combination of hardware and software, software, or software in execution. For example, a component may be, but is not limited to, a process running on a processor, a processor, an object, an executable, a thread of execution, a program, and a computer. By way of illustration, an application running on a server and/or the server can be a component. In addition, a component may include one or more subcomponents.

With reference to FIG. 10, an exemplary system environment 1000 for implementing the various aspects of the invention includes a conventional computer 1002, including a processing unit 1004, a system memory 1006, and a system bus 1008 that couples various system components, including the system memory, to the processing unit 1004. The processing unit 1004 may be any commercially available or proprietary processor. In addition, the processing unit may be implemented as multi-processor formed of more than one processor, such as may be connected in parallel.

The system bus 1008 may be any of several types of bus structure including a memory bus or memory controller, a peripheral bus, and a local bus using any of a variety of conventional bus architectures such as PCI, VESA, Microchannel, ISA, and EISA, to name a few. The system memory 1006 includes read only memory (ROM) 1010 and random access memory (RAM) 1012. A basic input/output system (BIOS) 1014, containing the basic routines that help to transfer information between elements within the computer 1002, such as during start-up, is stored in ROM 1010.

The computer 1002 also may include, for example, a hard disk drive 1016, a magnetic disk drive 1018, e.g., to read from or write to a removable disk 1020, and an optical disk drive 1022, e.g., for reading from or writing to a CD-ROM disk 1024 or other optical media. The hard disk drive 1016, magnetic disk drive 1018, and optical disk drive 1022 are connected to the system bus 1008 by a hard disk drive interface 1026, a magnetic disk drive interface 1028, and an optical drive interface 1030, respectively. The drives 1016-1022 and their associated computer-readable media provide nonvolatile storage of data, data structures, computer-executable instructions, etc. for the computer 1002. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, can also be used in the exemplary operating environment 1000, and further that any such media may contain computer-executable instructions for performing the methods of the present invention.

A number of program modules may be stored in the drives 1016-1022 and RAM 1012, including an operating system 1032, one or more application programs 1034, other program modules 1036, and program data 1038. The operating system 1032 may be any suitable operating system or combination of operating systems. By way of example, the application programs 1034 and program modules 1036 can include facilitating client-based web-crawling in accordance with an aspect of the present invention.

A user can enter commands and information into the computer 1002 through one or more user input devices, such as a keyboard 1040 and a pointing device (e.g., a mouse 1042). Other input devices (not shown) may include a microphone, a joystick, a game pad, a satellite dish, wireless remote, a scanner, or the like. These and other input devices are often connected to the processing unit 1004 through a serial port interface 1044 that is coupled to the system bus 1008, but may be connected by other interfaces, such as a parallel port, a game port or a universal serial bus (USB). A monitor 1046 or other type of display device is also connected to the system bus 1008 via an interface, such as a video adapter 1048. In addition to the monitor 1046, the computer 1002 may include other peripheral output devices (not shown), such as speakers, printers, etc.

It is to be appreciated that the computer 1002 can operate in a networked environment using logical connections to one or more remote computers 1060. The remote computer 1060 may be a workstation, a server computer, a router, a peer device or other common network node, and typically includes many or all of the elements described relative to the computer 1002, although, for purposes of brevity, only a memory storage device 1062 is illustrated in FIG. 10. The logical connections depicted in FIG. 10 can include a local area network (LAN) 1064 and a wide area network (WAN) 1066. Such networking environments are commonplace in offices, enterprise-wide computer networks, intranets and the Internet.

When used in a LAN networking environment, for example, the computer 1002 is connected to the local network 1064 through a network interface or adapter 1068. When used in a WAN networking environment, the computer 1002 typically includes a modem (e.g., telephone, DSL, cable, etc.) 1070, or is connected to a communications server on the LAN, or has other means for establishing communications over the WAN 1066, such as the Internet. The modem 1070, which can be internal or external relative to the computer 1002, is connected to the system bus 1008 via the serial port interface 1044. In a networked environment, program modules (including application programs 1034) and/or program data 1038 can be stored in the remote memory storage device 1062. It will be appreciated that the network connections shown are exemplary and other means (e.g., wired or wireless) of establishing a communications link between the computers 1002 and 1060 can be used when carrying out an aspect of the present invention.

In accordance with the practices of persons skilled in the art of computer programming, the present invention has been described with reference to acts and symbolic representations of operations that are performed by a computer, such as the computer 1002 or remote computer 1060, unless otherwise indicated. Such acts and operations are sometimes referred to as being computer-executed. It will be appreciated that the acts and symbolically represented operations include the manipulation by the processing unit 1004 of electrical signals representing data bits which causes a resulting transformation or reduction of the electrical signal representation, and the maintenance of data bits at memory locations in the memory system (including the system memory 1006, hard drive 1016, floppy disks 1020, CD-ROM 1024, and remote memory 1062) to thereby reconfigure or otherwise alter the computer system's operation, as well as other processing of signals. The memory locations where such data bits are maintained are physical locations that have particular electrical, magnetic, or optical properties corresponding to the data bits.

Figure 11:
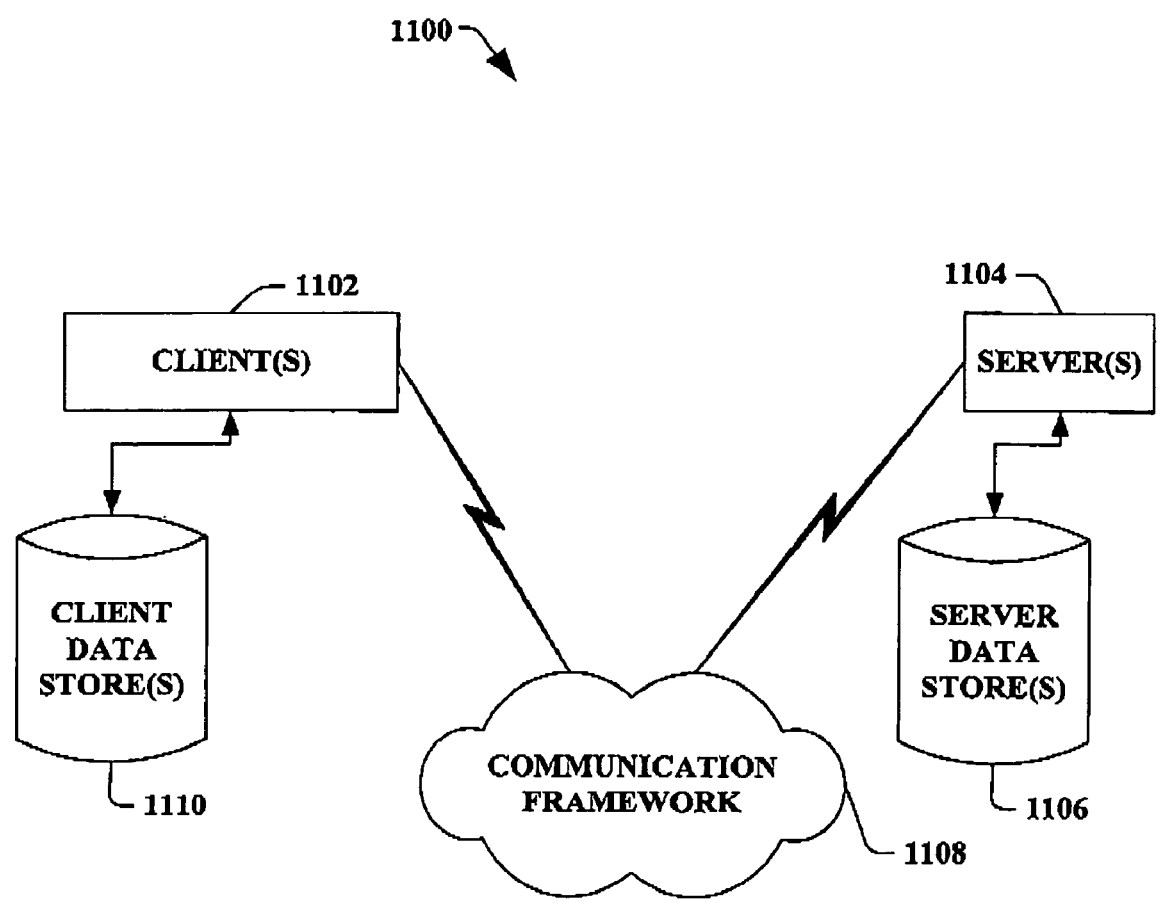

FIG. 11 is another block diagram of a sample computing environment 1100 with which the present invention can interact. The system 1100 further illustrates a system that includes one or more client(s) 1102. The client(s) 1102 can be hardware and/or software (e.g., threads, processes, computing devices). The system 1100 also includes one or more server(s) 1104. The server(s) 1104 can also be hardware and/or software (e.g., threads, processes, computing devices). The servers 1104 can house threads to perform transformations by employing the present invention, for example. One possible communication between a client 1102 and a server 1104 can be in the form of a data packet adapted to be transmitted between two or more computer processes. The system 1100 includes a communication framework 1108 that can be employed to facilitate communications between the client(s) 1102 and the server(s) 1104. The client(s) 1102 are operably connected to one or more client data store(s) 1110 that can be employed to store information local to the client(s) 1102. Similarly, the server(s) 1104 are operably connected to one or more server data store(s) 1106 that can be employed to store information local to the servers 1104.

In one instance of the present invention, a data packet transmitted between two or more computer components that facilitate web-crawling, the data packet is comprised of, at least in part, information relating to web-crawling that utilizes, at least in part, a distributed system for web-crawling.

In another instance of the present invention, a computer readable medium storing computer executable components of a system for facilitating web-crawling is comprised of, at least in part, a web-crawling system that determines, at least in part, information pertaining to web pages compiled by a distributed system for web-crawling.

It is to be appreciated that the systems and/or methods of the present invention can be utilized in web-crawling systems facilitating computer components and non-computer related components alike. Further, those skilled in the art will recognize that the systems and/or methods of the present invention are employable in a vast array of electronic related technologies, including, but not limited to, computers, servers and/or handheld electronic devices and the like which can be wired and/or wireless and the like.

One skilled in the art will also appreciate that the present invention can be utilized not only for server to client based crawling systems but also for peer-to-peer crawling systems. It is also possible that a client can perform tasking typically associated with "server" behavior and thus transfer some characteristics associated with the server to the client in some instances of the present invention. An example of one instance of the present invention is a client that performs "sub-crawls" to other clients to ascertain and/or retrieve information to send to a server. This instance can be beneficial, for example, in networks that have bottlenecks between certain clients and a server. Data can be transferred to a client with the best access to the server. In other instances of the present invention, a client can exhibit server behavior by initiating sub-crawls in an intranet system, thus reporting out information to a server from only a single and/or substantially reduced number of clients present on the intranet. In this manner a search server can initiate multiple sub-crawls in clients to expand its crawling resources.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer implemented system that facilitates web-crawling, comprising at least a processor, one or more memories with following components stored thereon:
   a managing component that performs a predictive analysis to predict when a web page will change, and determines when, and how to perform web-crawling;
   a server computer component that implements a web-crawling component that crawls subsets of web pages as a function of the predictive analysis, discovers and updates the pages in a catalogue of possible search results; and
   a decision-theoretic component that determines an appropriate time to crawl the at least one web page and makes predictions regarding changes in at least one web page based at least in part on:
      a probability that a particular outcome will occur, Pr; and
      a utility factor associated with each outcome, Utility (O);
      an action, a, selected from a set of possible actions, A, to be performed on the at least one web page, which maximizes the value of:

$$\sum_{o \in O} Pr(o \mid a) \times Utility(o)$$

where o is an outcome selected from a set of possible outcomes, O, wherein the outcome o maximizes the efficiency of the web-crawling component in discovering and updating changed web pages.

2. The system of claim 1, the predictive analysis is based at least in part on the utility of the at least one web page.

3. The system of claim 1, the predictive analysis is based at least in part on historical data related to the at least one web page.

4. The system of claim 1, the predictive analysis is based at least in part on content contained in the at least one web page.

5. The system of claim 1, further comprising a bundling component that rearranges crawled web pages into new subsets according to the utility of the web pages.

6. The system of claim 1, the web-crawling component comprises a Round Robin crawling component that sequentially crawls web pages in a subset and ensures that every web page will be crawled within a crawling period, and a Greedy crawling component that non-sequentially crawls pages according to a score associated with each page.

7. A computer readable medium that has computer executable instructions stored thereon to:
   predict when a web page will change in order to determine when, and how to perform web-crawling;
   crawl subsets of web pages based on the predicting when a web page will change, to catalogue possible web page search results; and
   determine an appropriate time to crawl the web page and make predictions regarding changes in at least one web page based at least in part on:
      a probability that a particular outcome will occur, Pr; and
      a utility factor associated with each outcome, Utility (O);
      an action, a, selected from a set of possible actions, A, to be performed on the at least one web page, which maximizes the value of:

$$\sum_{o \in O} Pr(o \mid a) \times Utility(o)$$

where o is an outcome selected from a set of possible outcomes, O, wherein the outcome o maximizes the efficiency of crawling in discovering and updating changed web pages.

8. The computer readable medium of claim 7, the instructions that predict are based at least in part on the utility of the at least one web page.

9. The computer readable medium of claim 7, the instructions that predict are based at least in part on historical data related to the at least one web page.

10. The computer readable medium of claim 7, the instructions that predict are based at least in part on content contained in the at least one web page.

11. The computer readable medium of claim 7, further comprising instructions that rearrange the crawled web pages into new subsets according to the utility of the web pages.

12. The computer readable medium of claim 7, the instructions that crawl comprise instructions that sequentially crawl web pages in a subset within a crawling period, and non-sequentially crawl pages according to a score associated with each page.

13. A computer readable medium having stored thereon components that facilitate web-crawling, the components comprising:
- a managing component that performs a predictive analysis to predict when a web page will change, and determines when, and how to perform web-crawling;
- a server computer component that implements a web-crawling component that crawls subsets of web pages as a function of the predictive analysis, discovers and updates the pages in a catalogue of possible search results; and
- a decision-theoretic component that determines an appropriate time to crawl the at least one web page and makes predictions regarding changes in at least one web page based at least in part on:
  - a probability that a particular outcome will occur, Pr; and
  - a utility factor associated with each outcome, Utility (O);
- an action, a, selected from a set of possible actions, A, to be performed on the at least one web page, which maximizes the value of:

$$\sum_{o \in O} Pr(o \mid a) \times Utility(o)$$

where o is an outcome selected from a set of possible outcomes, O, wherein the outcome o maximizes the efficiency of the web-crawling component in discovering and updating changed web pages.

14. The medium of claim 13, the predictive analysis is based at least in part on the utility of the at least one web page.

15. The medium of claim 13, the predictive analysis is based at least in part on historical data related to the at least one web page.

16. The medium of claim 13, the predictive analysis is based at least in part on content contained in the at least one web page.

17. The medium of claim 13, further comprising a bundling component that rearranges crawled web pages into new subsets according to the utility of the web pages.

18. The medium of claim 13, the web-crawling component comprises a Round Robin crawling component that sequentially crawls web pages in a subset and ensures that every web page will be crawled within a crawling period, and a Greedy crawling component that non-sequentially crawls pages according to a score associated with each page.

* * * * *